US006505938B2

(12) United States Patent
Chuang et al.

(10) Patent No.: US 6,505,938 B2
(45) Date of Patent: Jan. 14, 2003

(54) PROJECTION DISPLAY USING TRANSMISSIVE AND REFLECTIVE LIGHT VALVES

(75) Inventors: Fu-Ming Chuang, Hsin-Chu Hsien (TW); Sheng-Hsiung Chan, Hsin-Chu Hsien (TW); Han-Wen Tsai, Hsin-Chu Hsien (TW)

(73) Assignee: Prokia Technology Co., Ltd., Tainan Hsien (TW)

( * ) Notice: Subject to any disclaimer, the term of this patent is extended or adjusted under 35 U.S.C. 154(b) by 11 days.

(21) Appl. No.: 09/881,085

(22) Filed: Jun. 13, 2001

(65) Prior Publication Data

US 2002/0191157 A1 Dec. 19, 2002

(51) Int. Cl.⁷ .......................... G03B 21/00; G03B 21/26
(52) U.S. Cl. ............................. 353/31; 353/34
(58) Field of Search .............................. 349/7, 8, 9, 96, 349/97, 108, 117; 353/20, 30, 31, 33, 81, 84, 121, 122, 34, 37

(56) References Cited

U.S. PATENT DOCUMENTS 6,147,802 A  *  11/2000  Itoh et al. .................... 349/194
6,379,011 B1 *  4/2002  Knox ........................... 353/31

* cited by examiner

Primary Examiner—Russell Adams
Assistant Examiner—Andrew Sever
(74) Attorney, Agent, or Firm—Trop, Pruner & Hu, P.C.

(57) ABSTRACT

A projection display includes a transmissive first light valve and a reflective second light valve that are disposed adjacent to a polarization beam splitter prism and that are used to modulate first, second and third color components. The modulated first, second and third color components are then obtained from one side of the polarization beam splitter prism.

4 Claims, 5 Drawing Sheets

PROJECTION DISPLAY USING TRANSMISSIVE AND REFLECTIVE LIGHT VALVES

BACKGROUND OF THE INVENTION

1. Field of the Invention

The invention relates to a projection display that incorporates transmissive and reflective light modulators for modulating different color components.

2. Description of the Related Art

In order to form an output image on a display screen, primary color components, such as red, green and blue color components, are processed and then synthesized by a projection display to result in an output light beam that is projected by a projection lens.

Referring to FIG. 1, a first conventional projection display 1 is used to separate an input light beam from a light source into first, second and third color components 101, 102, 103, such as red, green and blue color components, which are subsequently and respectively modulated by first, second and third light valves 181, 182, 183. The projection display 1 includes a first dichroic mirror 11, a second dichroic mirror 12, a reflective mirror 13, a first polarization beam splitter prism 14, a second polarization beam splitter prism 15, a third polarization beam splitter prism 16, a color synthesizing prism 17, the first, second and third light valves 181, 182, 183, and a projection lens 19.

In operation, when the S-polarized first, second and third color components 101, 102, 103 are received by the first dichroic mirror 11, the first and third color components 101, 103 will be reflected by the first dichroic mirror 11 in a transverse direction toward the second dichroic mirror 12, whereas the second color component 102 will be allowed to pass through the first dichroic mirror 11 toward the reflective mirror 13. The second dichroic mirror 12 separates the first color component 101, which is allowed to pass therethrough toward the first polarization beam splitter prism 14, from the third color component 103, which is reflected by the second dichroic mirror 12 in a transverse direction toward the third polarization beam splitter prism 16. The reflective mirror 13 reflects the second color component 102 toward the second polarization beam splitter prism 15.

The first polarization beam splitter prism 14 directs the first color component 101 toward the first light valve 181. When activated, the first light valve 181 modulates the. first color component 101, and changes the polarization state of the first color component 101 from the S-polarization state to the P-polarization state. The first light valve 181 then reflects the modulated first color component 101 back to the first polarization beam splitter prism 14. The first polarization beam splitter prism 14 directs the modulated first color component 101 to the color synthesizing prism 17.

The second polarization beam splitter prism 15 directs the second color component 102 toward the second light valve 182. When activated, the second light valve 182 modulates the second color component 102, and changes the polarization state of the second color component 102 from the S-polarization state to the P-polarization state. The second light valve 182 then reflects the modulated second color component 102 back to the second polarization beam splitter prism 15. The second polarization beam splitter prism 15 directs the modulated second color component 102 to the color synthesizing prism 17.

The third polarization beam splitter prism 16 directs the third color component 103 toward the third light valve 183. When activated, the third light valve 183 modulates the third color component 103, and changes the polarization state of the third color component 103 from the S-polarization state to the P-polarization state. The third light valve 183 then reflects the modulated third color component 103 back to the third polarization beam splitter prism 16. The third polarization beam splitter prism 16 directs the modulated third color component 103 to the color synthesizing prism 17.

The color synthesizing prism 17 receives the modulated P-polarized first, second and third color components 101, 102, 103 from the first, second and third polarization beam splitter prisms 14, 15, 16, and provides the modulated P-polarized first, second and third color components 101, 102, 103 to the projection lens 19 so as to form an output image on a display screen (not shown).

It is noted that the conventional projection display 1 includes a large number of components, and is both bulky and heavy. In addition, the conventional projection display 1 utilizes three polarization beam splitter prisms and a color synthesizing prism, which are relatively expensive, thereby increasing the cost of the projection display 1. Moreover, aside from the high precision requirement and the difficult manufacturing process for the color synthesizing prism, the cementing planes of the four right-angle prisms that constitute the color synthesizing prism have an adverse affect on the resolution of the output image projected by the projection display 1. Furthermore, if the four right-angle prisms are imprecisely joined, the modulated color components cannot be properly combined to form a proper and high quality output image on the display screen.

Referring to FIG. 2, a second conventional projection display 2 is also capable of separating an input light beam from a light source into first, second and third color components 201, 202, 203, such as red, green and blue color components, which are subsequently modulated prior to reception by a projection lens (not shown) . The projection display 2 includes a first total internal reflection prism 21, a second total internal reflection prism 22, a third total internal reflection prism 23, a dichroic color splitting prism 24, a first digital micro-reflective light valve 25, and a second digital micro-reflective light valve 26. A total reflection interface 221, in the form of a clearance, is provided between the first and second total internal reflection prisms 21, 22. A color splitting interface 222 is present between the second total internal reflection prism 22 and the dichroic color splitting prism 24.

In operation, when the first, second and third color components 201, 202, 203 are received by the first total internal reflection prism 21, they will be reflected by the first total internal reflection prism 21 toward the second total internal reflection prism 22. The first color component 201 will be reflected by the color splitting interface 222 and then by the total reflection interface 221 so as to be received by the first digital micro-reflective light valve 25. When activated, the first digital micro-reflective light valve 25 modulates the first color component 201, and reflects the modulated first color component 201 back to the total internal reflection interface 221. The modulated first color component 201 is then reflected by the total internal reflection interface 221 to the color splitting interface 222, and is further reflected by the color splitting interface 222 to pass through the second total internal reflection prism 22, the first total internal reflection prism 21, and the third total internal reflection prism 23 in sequence. On the other hand, the second and third color components 202, 203 will pass through the second total internal reflection prism 22 and the dichroic color splitting prism 24 so as to be received by the second digital micro-reflective light valve 26. When activated, the second digital micro-reflective light valve 26 modulates the second and third color components 202, 203, and reflects the modulated second and third color components 202, 203 such that the latter can pass through the dichroic color splitting prism 24, the second total internal reflection prism 22, the first total internal reflection prism 21, and the third total internal reflection prism 23 in sequence. The modulated first, second and third color components 201, 202, 203 from the third total internal reflection prism 23 are then provided to the projection lens (not shown) for forming an output image on a display screen (not shown).

It is noted that the conventional projection display 2 is also bulky, heavy and relatively expensive-due to its use of three total internal reflection prisms and the dichroic color splitting prism.

Referring to FIG. 3, a third conventional projection display 3 separates an input light beam from a light source into first, second and third color components 301, 302, 303, such as red, green and blue color components, which are subsequently modulated by first and second light valves 35, 36. The projection display 3 includes a notch filter 31, a compound member 32 formed from a quarter-wavelength plate 321 and a base lining mirror 322, a polarization beam splitter prism 33, the first and second light valves 35, 36, and a projection lens 37.

In operation, when the first, second and third color components 301, 302, 303 are received by the notch filter 31, the first and second color components 301, 302 will be reflected by the notch filter 31 toward the polarization beam splitter prism 33, whereas the third color component 303 will pass through the notch filter 31 and reach the compound member 32. The polarization beam splitter prism 33 directs the first and second color components 301, 302 to the first light valve 35. When activated, the first light valve 35 modulates the first and second color components 301, 302, and reflects the modulated first and second color components 301, 302 back to the polarization beam splitter prism 33. The compound member 32 changes the polarization state of the third color component 303, and reflects the third color component 303 such that the latter passes through the notch filter 31 and reaches the polarization beam splitter prism 33. The polarization beam splitter prism 33 allows the third color component 303 to pass therethrough and reach the second light valve 36. When activated, the second light valve 36 modulates the third color component 303, and reflects the modulated third color component 363 back to the polarization beam splitter prism 33. The projection lens 37 receives the modulated first, second and third color components 301, 302, 303 from the polarization beam splitter prism 33.

It is noted that the projection display 3 is relatively expensive and has relatively poor contrast and efficiency due to the use of the notch filter 31 and the compound member 32.

SUMMARY OF THE INVENTION

Therefore, the object of the present invention is to provide a projection display that has a relatively simple and compact construction, that is relatively inexpensive, and that is capable of generating a high quality output image.

According to the present invention, a projection display is adapted to process first, second and third color components of an input light beam, and comprises a polarization beam splitter prism, a transmissive first light valve, and a reflective second light valve. The polarization beam splitter prism has a first side, a second side opposite to the first side, a third side between the first and second sides, and a fourth side opposite to the third side. The first light valve is disposed adjacent to the first side of the polarization beam splitter prism. The reflective second light valve is disposed adjacent to the third side of the polarization beam splitter prism.

In one embodiment, the polarization beam splitter prism is adapted to receive the first and second color components at the second side thereof, and reflects the first and second color components to pass through the third side thereof for reception by the second light valve. The second light valve modulates the first and second color components, and changes polarization state of the first and second color components. The second light valve reflects modulated first and second color components to the polarization beam splitter prism so as to enable the polarization beam splitter prism to direct the modulated first and second color components to pass through the fourth side thereof. The first light valve is adapted to receive the third color component, to modulate the third color component, and to change polarization state of the third color component so as to generate a modulated third color component that is provided to the first side of the polarization beam splitter prism. The polarization beam splitter prism directs the modulated third color component received thereby to pass through the fourth side thereof. Preferably, the first and second color components are alternately provided to the polarization beam splitter prism.

In another embodiment, the polarization beam splitter prism is adapted to receive the third color component at the second side thereof, and reflects the third color component to pass through the third side thereof for reception by the second light valve. The second light valve modulates the third color component, and changes polarization state of the third color component. The second light valve reflects a modulated third color component to the polarization beam splitter prism so as to enable the polarization beam splitter prism to direct the modulated third color component to pass through the fourth side thereof. The first light valve is adapted to receive the first and second color components, to modulate the first and second color components, and to change polarization state of the first and second color components so as to generate modulated first and second color components that are provided to the first side of the polarization beam splitter prism. The polarization beam splitter prism directs the modulated. first and second color components received thereby to pass through the fourth side thereof. Preferably, the first and second color components are alternately provided to the first light valve.

BRIEF DESCRIPTION OF THE DRAWINGS

Other features and advantages of the present invention will become apparent in the following detailed description of the preferred embodiments with reference to the accompanying drawing, of which.

DETAILED DESCRIPTION OF THE PREFERRED EMBODIMENTS

Figure 1:
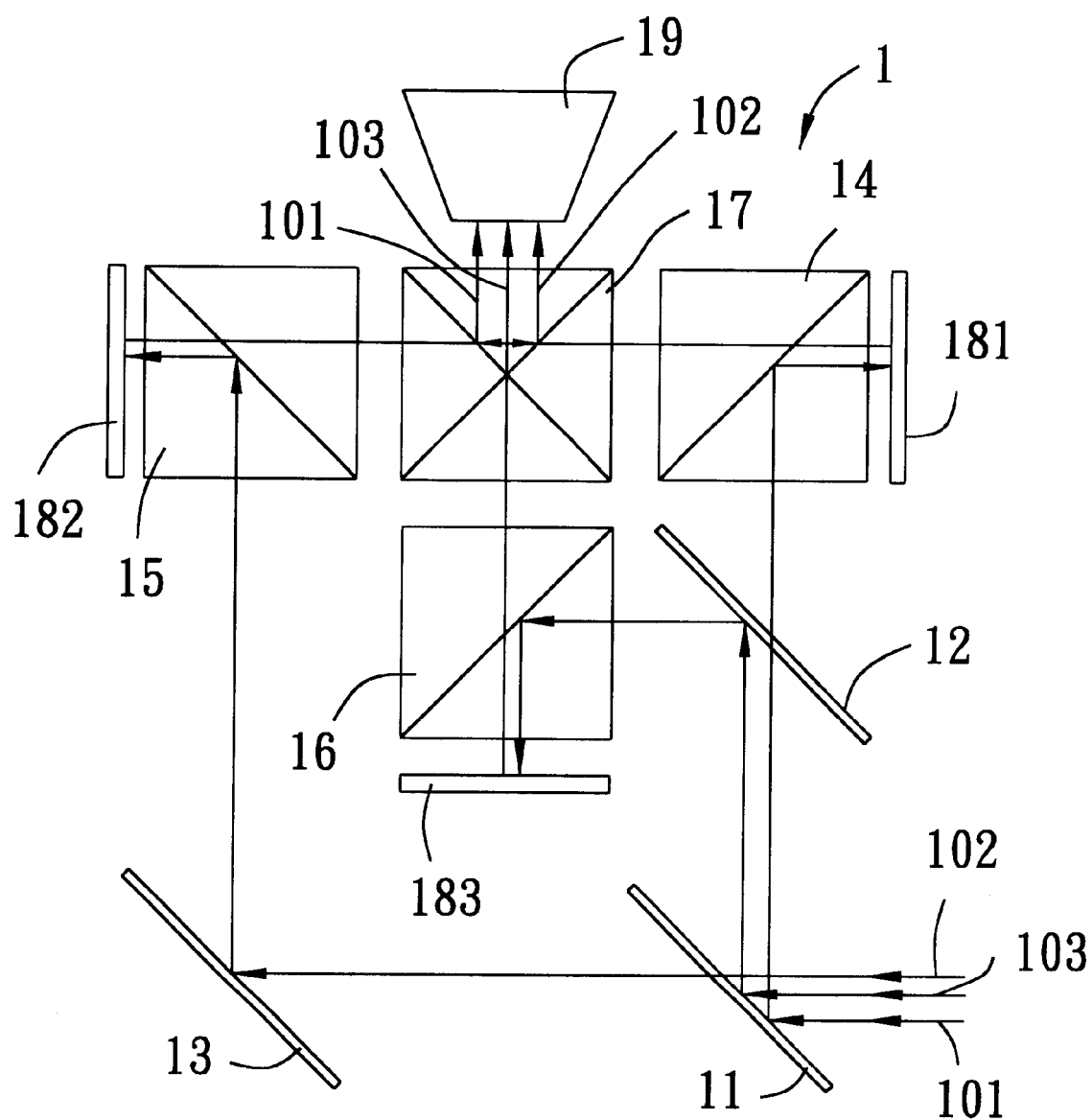
FIG. 1 is a schematic view showing a first conventional projection display.
Figure 2:
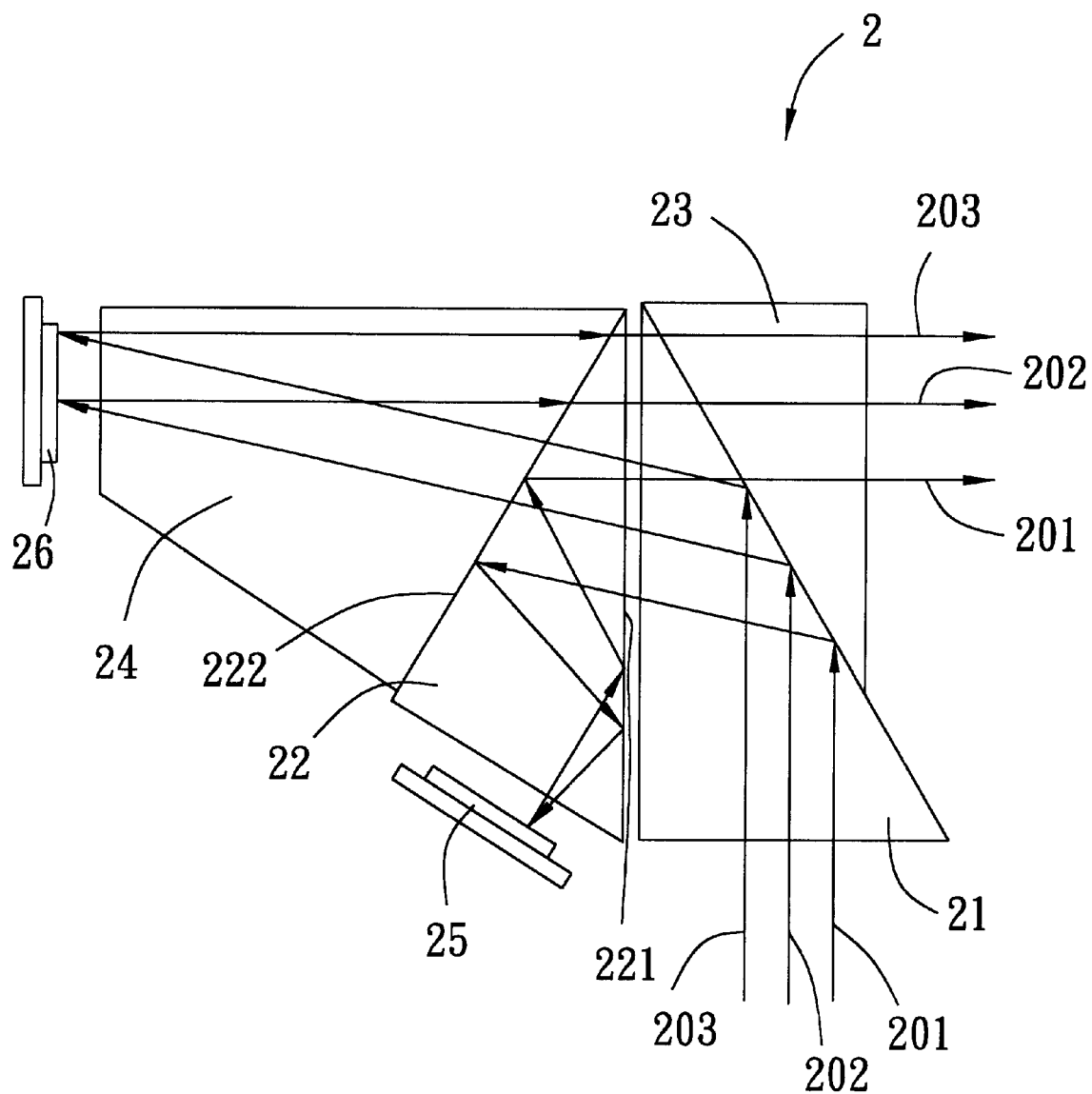
FIG. 2 is a schematic view showing a second conventional projection display.
Figure 3:
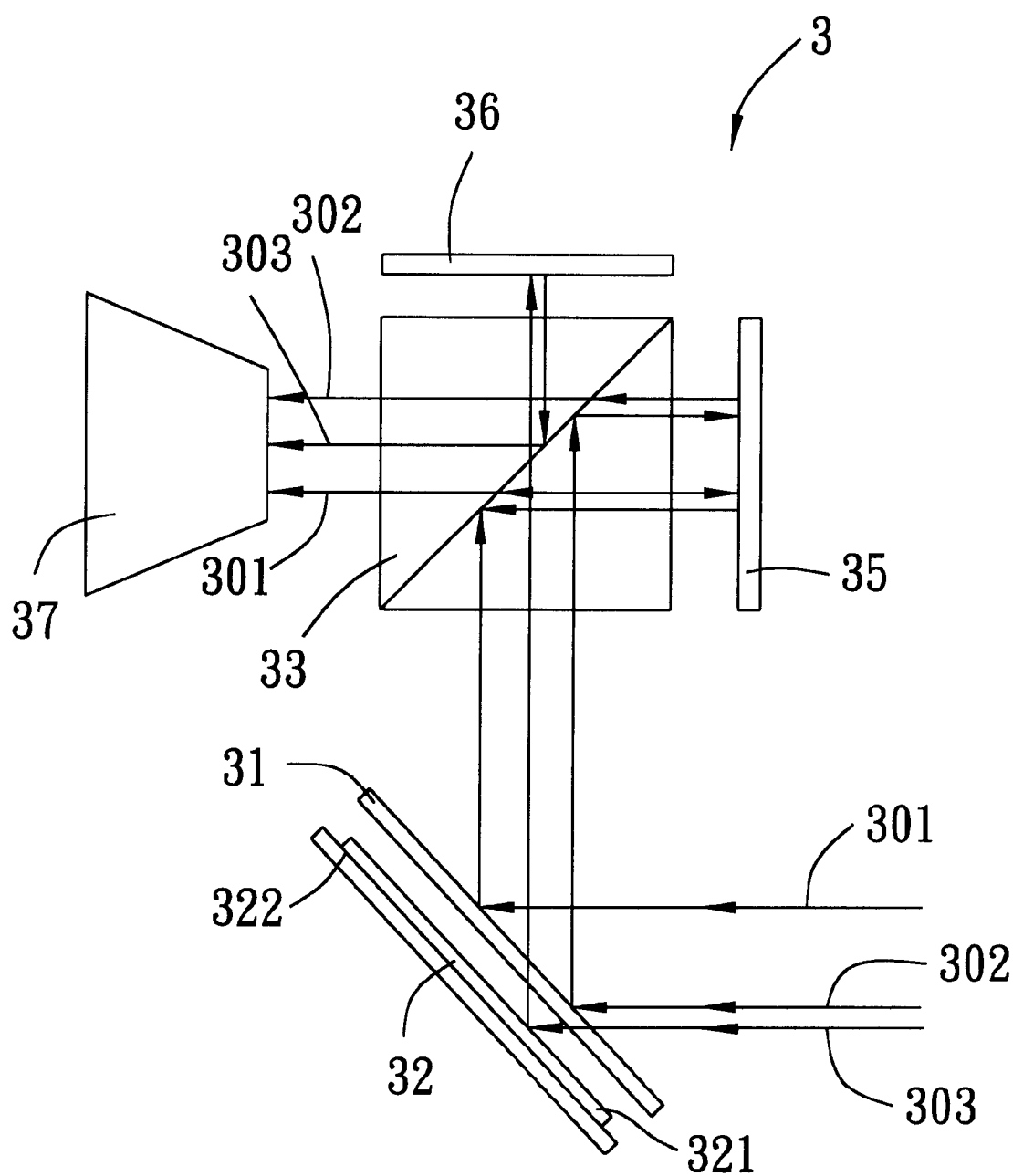
FIG. 3 is a schematic view showing a third conventional projection display.
Figure 4:
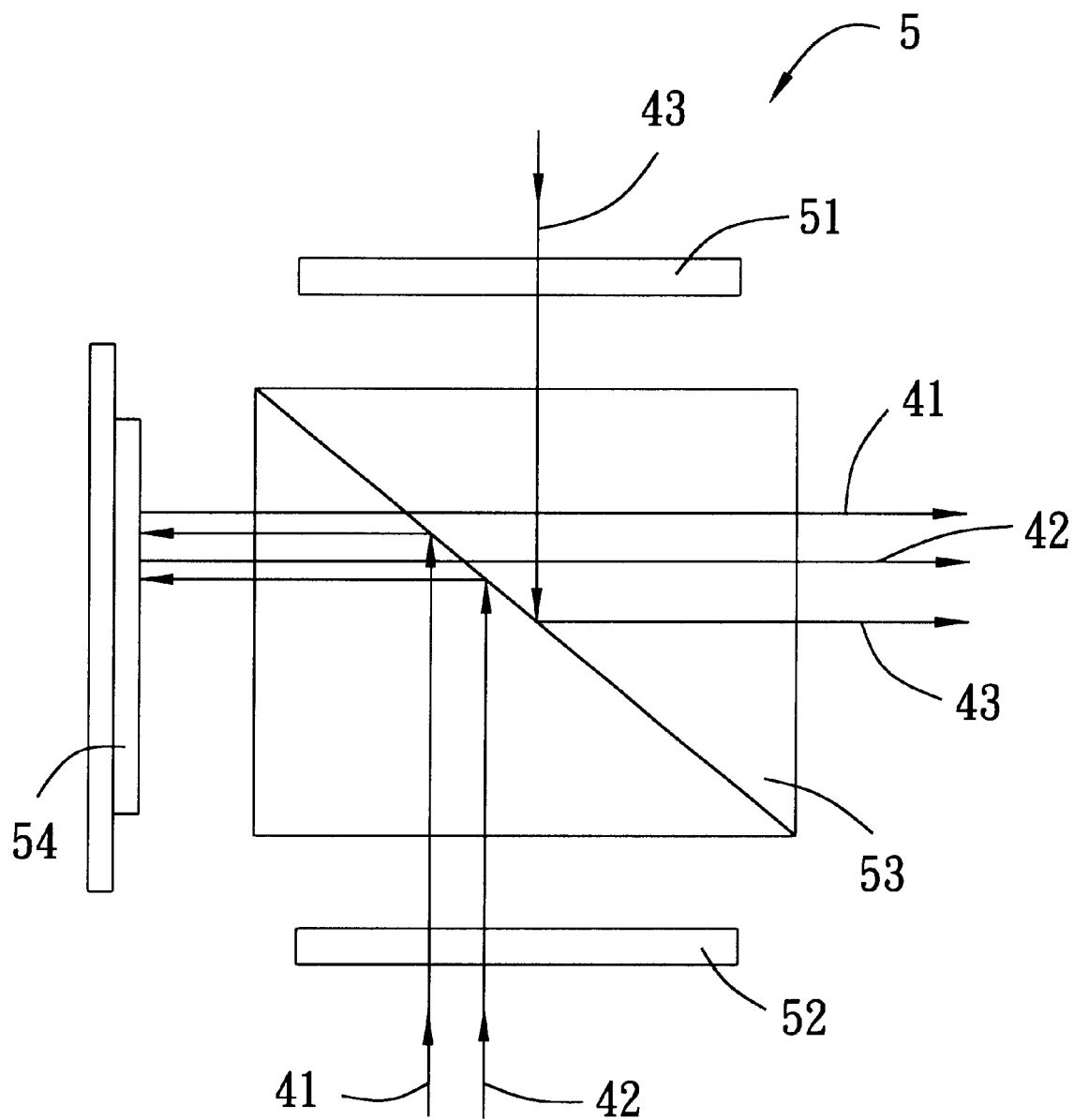
FIG. 4 is a schematic view showing the first preferred embodiment of a projection display according to the present invention.

Referring to FIG. 4, in the first preferred embodiment of a projection display 5 according to the present invention, an input light beam from a light source is separated into first, second and third color components 41, 42, 43, such as red, green and blue color components, which are subsequently modulated before being provided to a projection lens (not shown). The projection display 5 includes a first light valve 51, a color wheel 52, a polarization beam splitter prism 53, and a second light valve 54.

The first light valve 51, such as a transmissive light valve, is disposed adjacent to a first side of the polarization beam splitter prism 53, and is adapted to receive the third color component 43, such as the green color component. When activated, the first light valve 51 modulates the third color component 43, and changes the polarization state of the third color component 43 from a first or P-polarization state to a second or S-polarization state. The first light valve 51 then allows the modulated third color component 43 to pass therethrough for reception by the polarization beam splitter prism 53 at the first side of the latter.

The color wheel 52 is disposed adjacent to a second side of the polarization beam splitter prism 53 opposite to the first side. The color wheel 52 allows selected colors to pass therethrough in sequence. In this embodiment, the color wheel 52 allows the first and second color components 41, 42, such as the red and blue color components, to pass therethrough alternatingly. The color wheel 52 can be replaced by a color switch, such as the one available from ColorLink, Inc. The color switch receives input white light, and separates the same into red, green and blue primary color components that are outputted at different times according to a desired color sequence. More particularly, the color switch can be controlled to output only one of the three primary color components at one time, to output two of the three primary color components at one time, or to output the three primary color components at the same time. In this embodiment, the color switch is controlled so as to output the first and second color components 41, 42 alternatingly.

The second light valve 54, such as a reflective liquid crystal light valve, is disposed adjacent to a third side of the polarization beam splitter prism 53 between the first and second sides, and receives the first and second color components 41, 42, such as the red and blue color components, therefrom. When activated, the second light valve 54 modulates the first and second color component 41, 42, and changes the polarization state of the first and second color components 41, 42 from the second or S-polarization state to the first or P-polarization state. The second light valve 54 then reflects the modulated first and second color components 41, 42 back to the third side of the polarization beam splitter prism 53.

The polarization beam splitter prism 53 reflects S-polarized light, and allows P-polarized light to pass therethrough. Thus, the S-polarized modulated third color component 43 from the first light valve 51 is reflected by the polarization beam splitter prism 53 so as to pass through a fourth side thereof opposite to the third side. The S-polarized first and second color components 41, 42 from the color wheel 52 are reflected by the polarization beam splitter prism 53 so as to pass through the third side thereof for reception by the second light valve 54. The P-polarized modulated first and second color components 41, 42 from the second light valve 54 are permitted by the polarization beam splitter prism 53 to pass through the fourth side of the same. The modulated first, second and third color components 41, 42, 43 from the polarized beam splitter prism 53 are then provided to the projection lens (not shown) for forming an output image on a display screen (not shown).

Figure 5:
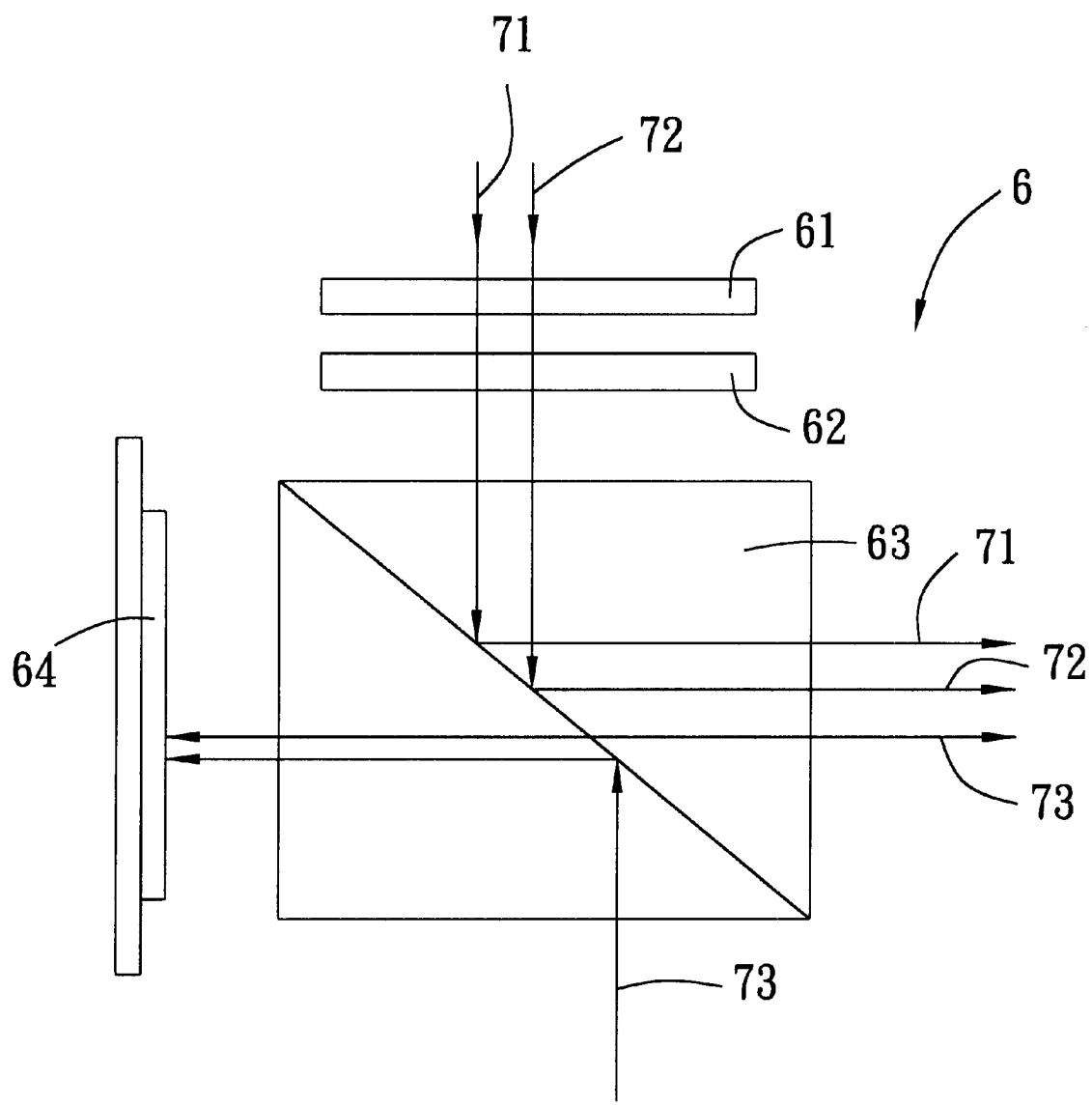
FIG. 5 is a schematic view showing the second preferred embodiment of a projection display according to the present invention.

Referring to FIG. 5, in the second preferred embodiment of a projection display 6 according to the present invention, an input light beam from a light source is separated into first, second and third color components 71, 72, 73, such as red, green and blue color components, which are subsequently modulated before providing the same to a projection lens (not shown). The projection display 6 also includes a color wheel 61, a first light valve 62, a polarization beam splitter prism 63, and a second light valve 64.

The color wheel 61 is disposed adjacent to a first side of the polarization beam splitter prism 53, and allows the first and second color components 71, 72, such as the red and blue color components, to pass therethrough in sequence. Like the previous embodiment, the color wheel 61 can be replaced by the color switch described beforehand.

The first light valve 62, such as a transmissive light valve, is disposed between the color wheel 61 and the first side of the polarization beam splitter prism 53, and receives the first and second color components 71, 72 from the color wheel 61. When activated, the first light valve 62 modulates the first and second color component 71, 72, and changes the polarization state of the first and second color components 71, 72. The first light valve 62 then allows the modulated first and second color components 71, 72 to pass therethrough for reception by the polarization beam splitter prism 63 at the first side thereof.

The polarization beam splitter prism 63 further receives the third color component 73 at a second side thereof opposite to the first side. The polarization beam splitter prism 63 reflects the third color component 73 so as to pass through a third side thereof between the first and second sides.

The second light valve 64, such as a reflective liquid crystal light valve, is disposed adjacent to the third side of the polarization beam splitter prism 63, and receives the third color component 73 therefrom. When activated, the second light valve 64 modulates the third color component 73, and changes the polarization state of the same. The second light valve 64 then reflects the modulated third color component 73 back to the third side of the polarization beam splitter prism 63.

The polarization beam splitter prism 63 reflects the modulated first and second color components 71, 72 from the first light valve 62 so as to pass through a fourth side thereof opposite to the third side, and allows the modulated third color component 73 from the second light valve 64 to pass through the fourth side thereof. The modulated first, second and third color components 71, 72, 73 from the polarized beam splitter prism 63 are then provided to the projection lens (not shown) for forming an output image on a display screen (not shown)

It has thus been shown that the projection display of this invention uses both transmissive and reflective light valves to dispense with the need for complex color synthesizing or total internal reflection prisms, thereby resulting in a simple, compact and relatively inexpensive structure.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A projection display adapted to process first, second and third color components of an input light beam, said projection display comprising:

a polarization beam splitter prism having a first side, a second side opposite to said first side, a third side between said first and second sides, and a fourth side opposite to said third side;

a transmissive first light valve disposed adjacent to said first side of said polarization beam splitter prism; and a reflective second light valve disposed adjacent to said third side of said polarization beam splitter prism;

wherein said polarization beam splitter prism is adapted to receive the first and second color components at said second side thereof, and reflects the first and second color components to pass through said third side thereof for reception by said second light valve, said second light valve modulating the first and second color components and changing polarization state of the first and second color components, said second light valve reflecting modulated first and second color components to said polarization beam splitter prism so as to enable said polarization beam splitter prism to direct the modulated first and second color components to pass through said fourth side thereof; and wherein said first light valve is adapted to receive the third color component, to modulate the third color component, and to change polarization state of the third color component so as to generate a modulated third color component that is provided to said first side of said polarization beam splitter prism, said polarization beam splitter prism directing the modulated third color component received thereby to pass through said fourth side thereof.

2. The projection display of claim 1, further comprising means, disposed adjacent to said second side of said polarization beam splitter prism, for alternately providing the first and second color components to said polarization beam splitter prism.

3. A projection display adapted to process first, second and third color components of an input light beam, said projection display comprising:

a polarization beam splitter prism having a first side, a second side opposite to said first side, a third side between said first and second sides, and a fourth side opposite to said third side;

a transmissive first light valve disposed adjacent to said first side of said polarization beam splitter prism; and a reflective second light valve disposed adjacent to said third side of said polarization beam splitter prism;

wherein said polarization beam splitter prism is adapted to receive the third color component at said second side thereof, and reflects the third color component to pass through said third side thereof for reception by said second light valve, said second light valve modulating the third color component and changing polarization state of the third color component, said second light valve reflecting a modulated third color component to said polarization beam splitter prism so as to enable said polarization beam splitter prism to direct the modulated third color component to pass through said fourth side thereof; and wherein said first light valve is adapted to receive the first and second color components, to modulate the first and second color components, and to change polarization state of the first and second color components so as to generate modulated first and second color components that are provided to said first side of said polarization beam splitter prism, said polarization beam splitter prism directing the modulated first and second color components received thereby to pass through said fourth side thereof.

4. The projection display of claim 3, further comprising means, disposed adjacent to said first light valve, for alternately providing the first and second color components to said first light valve.

* * * * *